United States Patent
Niizuma (12)

(10) Patent No.: US 9,007,002 B2
(45) Date of Patent: Apr. 14, 2015

(54) DEVICE AND METHOD FOR POWER-SAVING DRIVING OF DEVICE HAVING SAME LOAD PATTERN

(75) Inventor: Motonao Niizuma, Tokyo (JP)

(73) Assignee: IHI Corporation, Tokyo (JP)

( * ) Notice: Subject to any disclaimer, the term of this patent is extended or adjusted under 35 U.S.C. 154(b) by 162 days.

(21) Appl. No.: 13/704,848

(22) PCT Filed: Jun. 13, 2011

(86) PCT No.: PCT/JP2011/063468
§ 371 (c)(1),
(2), (4) Date: Dec. 17, 2012

(87) PCT Pub. No.: WO2011/158775
PCT Pub. Date: Dec. 22, 2011

(65) Prior Publication Data
US 2013/0088177 A1    Apr. 11, 2013

(30) Foreign Application Priority Data

Jun. 15, 2010    (JP) ................................ 2010-135657
Sep. 15, 2010    (JP) ................................ 2010-206221

(51) Int. Cl.
*H02P 1/00*         (2006.01)
*H02P 27/00*       (2006.01)
(Continued)

(52) U.S. Cl.
CPC .............. *H02P 27/00* (2013.01); *H02P 27/085* (2013.01); *H02J 7/0065* (2013.01); *H02J 17/00* (2013.01); *H02M 2001/0048* (2013.01); *Y02B 70/1491* (2013.01)

(58) Field of Classification Search
USPC .......................................... 318/139, 768, 494
See application file for complete search history.

(56) References Cited

U.S. PATENT DOCUMENTS

2003/0067278 A1    4/2003    Nakamura et al.
2007/0278986 A1    12/2007    Okamura
(Continued)

FOREIGN PATENT DOCUMENTS

JP          63-257497 A      10/1988
JP          5-184182 A       7/1993
(Continued)

OTHER PUBLICATIONS

International Search Report in corresponding application No. PCT/JP2011/063468, completed Jul. 29, 2011 and mailed Aug. 9, 2011.
(Continued)

*Primary Examiner* — Karen Masih
(74) *Attorney, Agent, or Firm* — Griffin & Szipl, P.C.

(57) ABSTRACT

A power-saving driving device is provided for a device 23 having the same load pattern and driven by a motor 21 receiving electric power from an inverter 19. The power-saving driving device includes a DC-DC converter 93 driven by a battery 91 and the inverter driven by an output of the DC-DC converter. The power-saving driving device further includes an electric power amount W calculator 81 that calculates an electric power amount received from the battery in the same load pattern, and a parameter selection/instruction unit 83 that causes a parameter (carrier wave frequency instruction value F and output voltage instruction value G) of the inverter to change to be a plurality of values, compares the received electric power amounts respectively corresponding to the values of the parameter, selects the parameter value minimizing the received electric power amount, and instructs the selected parameter value to the inverter.

10 Claims, 11 Drawing Sheets

(51) Int. Cl.
    *H02P 27/08*    (2006.01)
    *H02J 7/00*     (2006.01)
    *H02J 17/00*    (2006.01)
    *H02M 1/00*     (2006.01)

(56) References Cited

U.S. PATENT DOCUMENTS

| | | | |
|---|---|---|---|
| 2008/0231120 A1 | | 9/2008 | Jin |
| 2011/0227421 A1 | | 9/2011 | Sakota et al. |
| 2013/0062941 A1 | * | 3/2013 | Yamamoto et al. .......... 307/10.6 |

FOREIGN PATENT DOCUMENTS

| | | |
|---|---|---|
| JP | 10-174206 A | 6/1998 |
| JP | 11-299290 A | 10/1999 |
| JP | 2000-217277 A | 8/2000 |
| JP | 2002-67746 A | 3/2002 |
| JP | 2003-116280 A | 4/2003 |
| JP | 2007-325351 A | 12/2007 |
| JP | 2008-236916 A | 10/2008 |
| JP | 2009-136058 A | 6/2009 |
| JP | 2009-194950 A | 8/2009 |
| JP | 2009-225551 A | 10/2009 |
| JP | 2010-130878 A | 6/2010 |
| JP | 2010-141976 A | 6/2010 |
| JP | 2010-141977 A | 6/2010 |
| JP | 2010-158151 A | 7/2010 |

OTHER PUBLICATIONS

Edited by the Institute of Electrical Engineers of Japan, Semiconductor Power Converter Investigating research Committees, "Power Electronics Circuits", published by Ohmsha, Japan, 2000.
Okubo, Koichi, et al. "Development of the Inverter to Decrease Loss for Electric Vehicle (EV) Motor", Mitsubishi Heavy Industries, Ltd. Technical Review vol. 45 No. 3, 2008.
Office Action issued in corresponding Chinese application 201180023413.6 on Dec. 3, 2014.

* cited by examiner

DEVICE AND METHOD FOR POWER-SAVING DRIVING OF DEVICE HAVING SAME LOAD PATTERN

This is a National Phase Application in the United States of International Patent Application No. PCT/JP2011/063468 filed Jun. 13, 2011, which claims priority on Japanese Patent Application Nos. 2010/135657, filed Jun. 15, 2010 and 2010/206221, filed Sep. 15, 2010. The entire disclosures of the above patent applications are hereby incorporated by reference.

TECHNICAL FIELD

The present invention relates to a device and a method for power-saving driving of a device having the same load pattern.

BACKGROUND ART

The present invention is directed to a device driven by a motor receiving electric power, and repeatedly operated in the same load pattern. Hereinafter, such a device is called a "same load pattern device".

According to a first configuration in which electric power is supplied to the motor from an inverter driven by an output of a battery-driven DC-DC converter, same load pattern devices assumed mainly include industrial devices such as a servo press, a die cushion for press, a transport device and a material handling device, but are not limited to them.

According to a second configuration in which the electric power is supplied to the motor from a wireless electric power transmission device, same load pattern devices assumed mainly include, but not limited to, industrial devices, such as a transport device mounted on a mobile device, e.g., an unmanned transport carriage, and a material handling device.

In the first configuration, the amount of loss in the above-described same load pattern device varies with parameters of a power conversion circuit such as an output voltage of a DC-DC converter, carrier wave frequency of an inverter or a voltage change ratio dv/dt of a switching waveform.

In the second configuration, the amount of loss in the above-described same load pattern device varies with parameters of the wireless electric power transmission device, such as oscillation frequency of the wireless electric power transmission device.

According to the first configuration, the "amount of loss" means the difference between electric power supplied from the battery and the motor output power, i.e., the amount of work lost as heat generation and electromagnetic radiation in the electric circuit (including the DC-DC converter, the inverter and the motor) from the battery to the motor and in the magnetic circuit inside the motor.

According to the second configuration, the "amount of loss" means the difference between electric power supplied from the wireless electric power transmission device and the motor output power, i.e., the amount of work lost as heat generation and electromagnetic radiation in the electric circuit from the wireless power electric transmission device to the motor and in the magnetic circuit inside the motor.

Regarding the first configuration, means for reducing this amount of loss have been already proposed in Patent Literature (PTL) 1, for example. The techniques relating to the present invention have been disclosed in PTL 2, Non-Patent Literature (NPL) 1 and NPL 2.

Regarding the second configuration, means for enhancing the transmission efficiency in a wireless electric power transmission device have already been proposed in, for example, PTLs 3 through 8.

PTL 1 discloses a technique of, when an operating condition of a device is changed, reducing the amount of loss by changing a parameter (carrier wave frequency of a DC-DC converter) of electric power conversion.

NPL 2 discloses a technique of reducing the loss by changing switching frequency during operation in accordance with a low-speed range, a medium-speed level and a high-speed range.

CITATION LIST

Patent Literature

PTL 1: Japanese Patent Application Laid-Open Publication No. 2003-116280, "Driving Device and Power Output Apparatus"
PTL 2: Japanese Patent Application Laid-Open Publication No. H05-184182, "Inverter Controller"
PTL 3: Japanese Patent Application Laid-Open Publication No. 2009-225551, "Electric Power Transmission System"
PTL 4: Japanese Patent Application Laid-Open Publication No. 2008-236916, "Wireless Electric Power Transmission Device"
PTL 5: Japanese Patent Application Laid-Open Publication No. 2010-158151, "Wireless Electric Power Transmission Device"
PTL 6: Japanese Patent Application Laid-Open Publication No. 2010-141977, "Electric Power Transmission Method in Wireless Electric Power Transmission Device, and Wireless Electric Power Transmission Device"
PTL 7: Japanese Patent Application Laid-Open Publication No. 2010-130878, "Wireless Electric Power Transmission Device"
PTL 8: Japanese Patent Application Laid-Open Publication No. 2010-141976, "Wireless Electric Power Transmission Device"

Non-Patent Literatures

NPL 1: Edited by The Institute of Electrical Engineers of Japan, Semiconductor Power Converter Investigating research Committees, "Power Electronics Circuits", published by Ohmsha, Japan, 2000
NPL 2: Ohkubo Koichi, et al. "Development of the Inverter to Decrease Loss for Electric Vehicle (EV) Motor", Mitsubishi Heavy Industries, Ltd. Technical Review Vol. 45 No. 3, 2008

SUMMARY OF INVENTION

Technical Problem

Regarding the first configuration, PTL 1 proposes means for obtaining carrier wave (called carrier) frequency reducing the amount of loss by (A) using loss characteristics of energy storage means, a switching device and coils for respective phases of a motor, or by (B) an experiment performed in advance.

However, the attempt to apply the means of PTL 1 to various devices, especially to battery-driven industrial devices such as a servo press, a die cushion for press, a transport device and a material handling device will cause the following problems.

As for (A), loss characteristics of other constituting elements are not considered.

For instance, the loss in the wiring between an inverter and a motor, the loss in a device (a ferrite core and a filter) for electromagnetic noise removal, or the loss (such as the loss due to an electric current inducted in the rotor) in the rotor of a motor is not considered.

In the case of industrial devices, the wiring between an inverter and a motor is long, the device for electromagnetic noise removal is larger, and the motor is large. For this reason, the amount of loss from these constituting elements often cannot be ignored.

As for (B), it is difficult to obtain data in advance (comprehensive loss characteristics) used for deciding carrier wave frequency.

The reason for this is as follows, for example:

(a) in the case of a combination of a battery-driven DC-DC converter and an inverter driven by the output of the DC-DC converter, the output voltage of a DC-DC converter cannot be optimized;

(b) since wiring work is carried out, electric characteristics of the wiring cannot be estimated in advance;

(c) a device for electromagnetic noise removal may be added after the installation of the device;

(d) a motor is often replaced because of trouble, and each motor has different characteristics; and (e) the temperature of a motor is low immediately after the operational starting of the device and rises as the device is operated continuously, while the loss characteristics of the motor changes with the temperature.

Meanwhile, regarding the second configuration, PTLs 3 to 8 described above are not intended for "the same load pattern".

Accordingly, if the relative position between an electric-power-supplying antenna coil and an electric-power-receiving antenna coil that constitute the wireless electric power transmission device changes, for example if a wirelessly powered mobile device such as an unmanned transport carriage stops at different positions each time, no compensation can be provided for an influence regarding the fluctuation in the stop positions. Accordingly, efficiency of the transmission of electric power is deteriorated.

Further, the wireless electric power transmission device has another problem in that the efficiency of the electric power transmission deteriorates also due to a change in temperature.

The present invention has been devised to cope with the above-stated problems.

It is the first object of the present invention to provide, relating to the first configuration, power-saving driving device and method for an device having the same load pattern, the power-saving driving device and method being capable of minimizing the amount of loss with consideration given to loss characteristics of all constituting elements and without a preliminary experiment that is performed for output voltages of a DC-DC converter, electric characteristics of the wiring, the presence or absence of a device for electromagnetic noise removal, loss characteristics and a temperature change for each motor and the like to acquire data on loss characteristics.

It is the second object of the present invention to provide, relating to the second configuration, power-saving driving device and method for an device having the same load pattern, the power-saving driving device and method being capable of automatically maintaining high efficiency of wireless electric power transmission even if resonance frequency changes due to a change in temperature or the like, or even if the relative position between an electric-power-supplying antenna coil and an electric-power-receiving antenna coil changes, for example.

Solution to Problem

In order to accomplish the first object, according to the present invention, there is provided a power-saving driving device that is provided for a device having the same load pattern and driven by a motor receiving electric power from an inverter, the power-saving driving device including a DC-DC converter driven by a battery and the inverter driven by an output of the DC-DC converter, and further including:

an electric power amount calculator that calculates an electric power amount received from the battery in the same load pattern; and a parameter selection/instruction unit that causes a parameter of the inverter to change to be a plurality of values, compares the received electric power amounts respectively corresponding to the values of the parameter, selects the parameter value minimizing the received electric power amount, and instructs the selected parameter value to the inverter.

According to the preferred embodiment of the present invention, the power-saving driving device further includes a command value generator that outputs a cycle start signal and a cycle end signal of the load pattern.

The parameter of the inverter may be carrier wave frequency and an output voltage of the DC-DC converter.

In order to accomplish the first object, according to the present invention, there is provided a power-saving driving method that is performed for a device having the same load pattern and driven by a motor receiving electric power from an inverter, the power-saving driving method including the step of providing a DC-DC converter driven by a battery and the inverter driven by an output of the DC-DC converter, and further including the steps of:

causing a parameter of the inverter to change to be a plurality of values;

calculating electric power amounts received from the battery in the same load pattern, the electric power amounts respectively corresponding to the values of the parameter;

comparing the received electric power amounts respectively corresponding to the values of the parameter;

selecting the parameter value minimizing the received electric power amount; and instructing the selected parameter value to the inverter.

In order to accomplish the second object, according to the present invention, there is provided a power-saving driving device that is provided for a device having the same load pattern and driven by a motor that receives electric power from a wireless electric power transmission device, the power-saving driving device including:

an electric power amount calculator that calculates an electric power amount on the primary side of the wireless electric power transmission device in the same load pattern; and a parameter selection/instruction unit that causes a parameter of the wireless electric power transmission device to change to be a plurality of values, compares the electric power amounts on the primary side respectively corresponding to the values of the parameter, selects the parameter value minimizing the electric power amount on the primary side, and instructs the selected parameter value to the wireless electric power transmission device.

According to the preferred embodiment of the present invention, the power-saving driving device further includes a command value generator that outputs a cycle start signal and a cycle end signal of the load pattern.

The parameter of the wireless electric power transmission device may be oscillation frequency on the electric-power-supplying side.

In order to accomplish the second object, according to the present invention, there is provided a power-saving driving method that is performed for a device having the same load pattern and driven by a motor that receives electric power from a wireless electric power transmission device, the power-saving driving method including the steps of:

causing a parameter of the wireless electric power transmission device to change to be a plurality of values;

calculating electric power amounts on the primary side of the wireless electric power transmission device in the same load pattern, the electric power amounts respectively corresponding to the values of the parameter;

comparing the electric power amounts on the primary side respectively corresponding to the values of the parameter;

selecting the parameter value minimizing the electric power amount on the primary side; and instructing the selected parameter value to the wireless electric power transmission device.

Advantageous Effects of Invention

According to the above-described device and method of the present invention, the device includes the electric power amount calculator and the parameter selection/instruction unit. The parameter of the inverter is changed to be a plurality of values, the amount of electric power received from the battery in the same load pattern is calculated for each parameter value for comparison, the parameter value minimizing the amount of electric power received is selected, and the selected parameter value is instructed to the inverter. As a result, the amount of loss can be minimized with consideration given to loss characteristics of all constituting elements and without obtaining data on loss characteristics by previously performing experiment for electric characteristics of the wiring, the presence or absence of a device for electromagnetic noise removal, loss characteristics and a temperature change of each motor and the like.

According to the above-described device and method of the present invention, the device includes the electric power amount calculator and the parameter selection/instruction unit. The parameter of the wireless electric power transmission device is changed to be a plurality of values, the amount of the primary side electric power of the wireless electric power transmission device in the same load pattern is calculated for each parameter value for comparison, the parameter value minimizing the amount of the primary side electric power is selected, and the selected parameter value is instructed to the wireless electric power transmission device. As a result, the efficiency of the wireless electric power transmission can be automatically maintained at a high efficiency even if resonance frequency changes due to a change in temperature or the like, or even if the relative position between an electric-power-supplying antenna coil and an electric-power-receiving antenna coil changes, for example.

DESCRIPTION OF EMBODIMENTS

Figure 1:
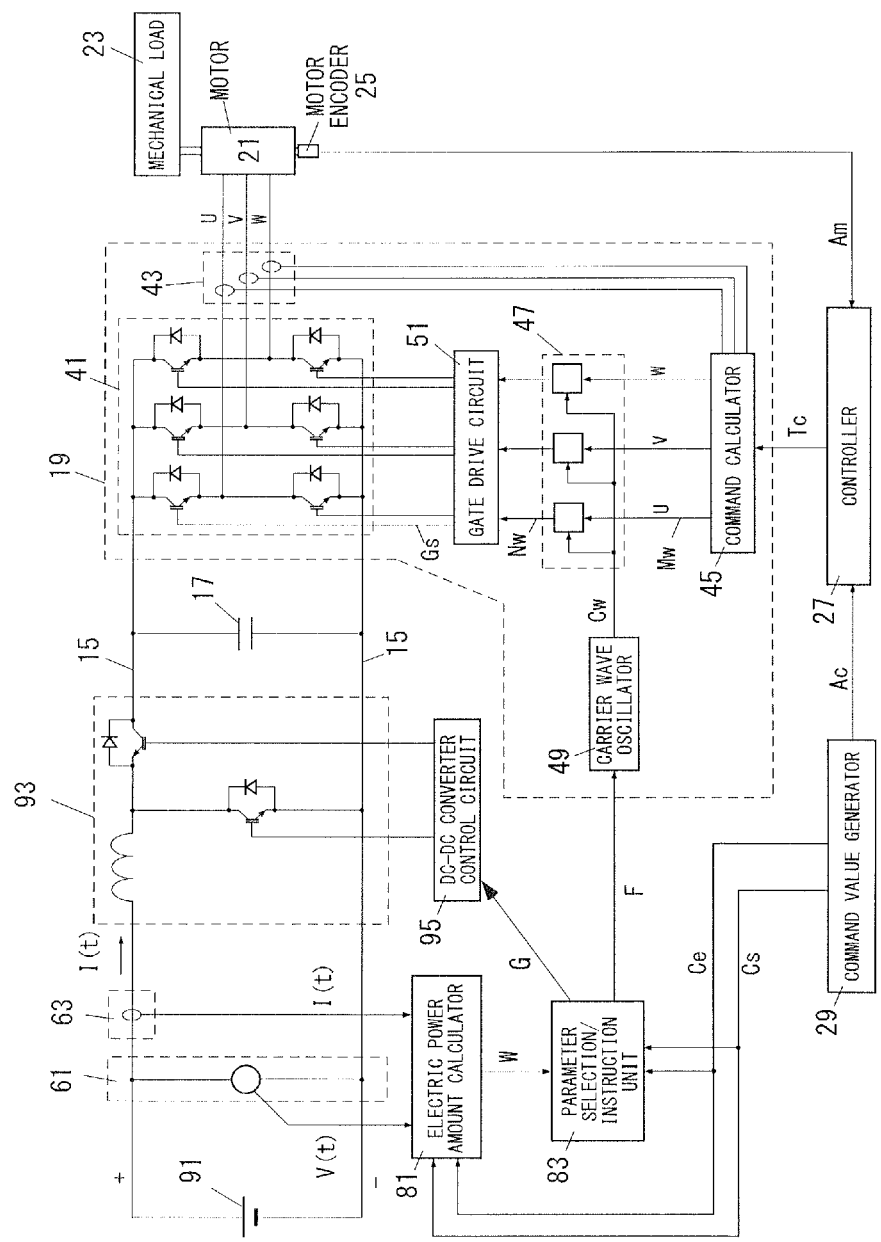
FIG. 1 illustrates a power-saving driving device of Embodiment 1 according to the present invention.

The following describes preferred embodiments of the present invention with reference to the attached drawings. In the drawings, the same reference numerals will be assigned to common parts, and duplicated description will be omitted.

Embodiment 1

FIG. 1 illustrates a power-saving driving device of Embodiment 1 according to the present invention. The power-saving driving device according to the present invention in the drawing includes a DC-DC converter 93 driven by a battery 91 and an inverter 19 driven by the output of the DC-DC converter 93.

The battery 91 is, for example, a secondary battery, such as a lithium-ion battery, a nickel-metal hydride battery, or a lead battery. The battery 91 has cells connected in series to increase the output voltage of the battery and also has a battery controller.

Further, the battery 91 is adapted to be charged with DC power by a solar battery, a fuel battery, a wind power generator or the like, which is not shown.

An input end (on the left end in the drawing) of the DC-DC converter 93 is connected to the battery 91, while an output end (on the right end in the drawing) is connected to the inverter 19.

The DC-DC converter 93 is a DC-DC converter that increases and/or decreases a DC voltage to change the output voltage. Referring to FIG. 1, the voltage across a capacitor 17 on the right side of the DC-DC converter 93 is the output voltage.

The DC-DC converter 93 is configured to be capable of not only performing power running (the electric power moving from left to right in FIG. 1) but also regeneration (the electric power moving from right to left in FIG. 1).

The DC-DC converter 93 is realized by combining a power control device such as an IGBT or a power MOSFET, with an inductor or transformer.

In FIG. 1, the reference numeral 95 denotes a DC-DC converter control circuit. The DC-DC converter control circuit 95 generates a gate signal of the power control device of the DC-DC converter 93 and controls the output voltage of the DC-DC converter 93.

The DC-DC converter control circuit 95 is constituted by an electronic circuit and/or by an embedded CPU and a dedicated control program.

A DC bus 15 electrically connects the DC-DC converter 93 and the inverter 19. In the drawing, the DC bus 15 illustrated on the upper side is the positive (+) side, and the DC bus 15 illustrated on the lower side is the negative (−) side.

The reference numeral 17 denotes a capacitor, which smoothes a voltage of the DC bus 15. As the capacitor 17, an aluminum electrolytic capacitor is often used, but other types of capacitors or an electric double layer capacitor may be used as the capacitor 17.

The reference numeral 19 denotes an inverter which controls the electric current and voltage flowing from the DC bus 15 to a motor 21 so that the motor 21 can generate a desired torque. The inverter 19 assumed in the present embodiment is a voltage-type inverter, but may be a current-type inverter. In the case where a current-type inverter is used, a reactor is used instead of the capacitor 17.

Further, the inverter 19 assumed in the present embodiment is a four-quadrant drive inverter enabling forward and reverse rotation, and power running and regeneration of the motor 21, but may be an inverter enabling a rotation only in one direction or an inverter enabling power running only, depending on the characteristics or the operation of a mechanical load 23 (same load pattern device). If an inverter capable of only power running, then the DC-DC converter 93 may be also capable of only power running.

The reference numeral 21 denotes a motor, and the combination of the inverter 19 and the motor 21 allows the motor 21 to generate torque in accordance with a torque command value input from a controller 27.

The motor 21 assumed in the present embodiment is a three-phase induction motor or a three-phase permanent magnet synchronous motor, but may be of other types if torque/rotational speed is variable based on the combination with an inverter.

The reference numeral 23 denotes a mechanical load, i.e., the same load pattern device which is driven by the motor 21.

The reference numeral 25 denotes a motor encoder which measures a rotational position (angle) of the motor 21. As the motor encoder 25, an optical or a magnetic rotary encoder or a resolver may be used. When the controller 27 controls speed, the rotational speed (angular speed) of the motor 21 may be measured. In this case, the time derivative of the rotational position measured by the rotary encoder or the resolver may be calculated, or the rotational speed may be directly measured by a tachometer.

The reference numeral 27 denotes a controller, and the inverter 19, the motor 21, the motor encoder 25 and the controller 27 make up a feedback loop, and control is performed so that the motor 21 follows a command value from a command value generator 29.

The controller 27 assumed in the present embodiment controls a position, but may control speed. As a calculation method in the controller, Proportional Integral Derivative (PID) control or Integral Proportional Derivative (I-PD) control is often used, but other control methods may be used as the calculation method in the controller. Feedfoward calculation may be combined therewith to improve controllability. The controller 27 can be implemented with a programmable device using a Digital Signal Processor (DSP) and a microcomputer, or with an analogue circuit or with the combination thereof.

The reference numeral 29 denotes a command value generator which outputs a motor rotational angle command value Ac to be followed by the motor 21, to the controller 27 at respective times. The motor rotational angle command value Ac may be conveyed by a two-phase pulse string with a 90° phase shift or by various communication networks. Since the rotational angle of the motor 21 and the mechanical load 23 are mechanically connected with each other, commanding the rotational angle of the motor 21 is synonymous with commanding the position of the mechanical load 23.

Figure 2:
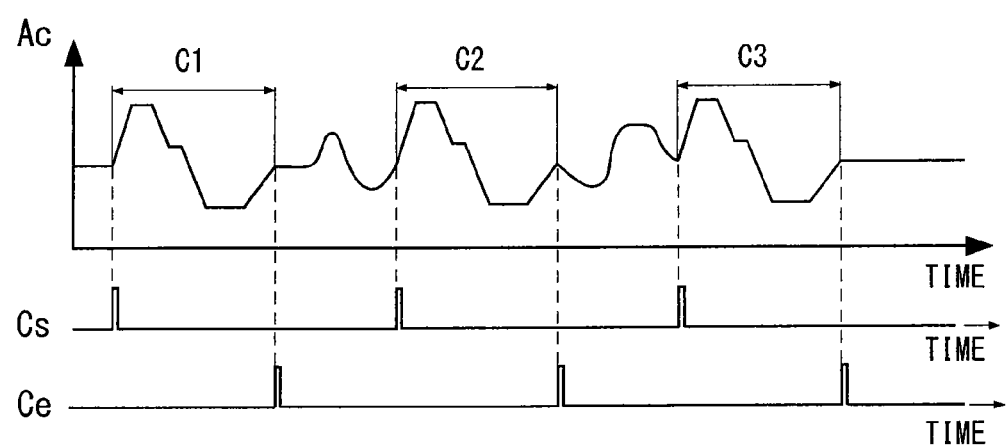
FIG. 2 illustrates an operation of a same load pattern device as a target for the present invention.

FIG. 2 illustrates an operation of the same load pattern device to which the present invention is applied.

Since the present invention is intended for a device (same load pattern device) repeatedly operated in the same load pattern, in the present embodiment as illustrated in FIG. 2, the motor rotational angle command value Ac has a cycle (repeated same pattern), and the command value generator 29 outputs a cycle start signal Cs and a cycle end signal Ce at a starting time and an ending time of a cycle, respectively.

In FIG. 2, C1, C2 and C3 each represent a cycle. Any command value may be output between cycles, e.g., a command value to stop the mechanical load 23 or a command value to make the mechanical load 23 operate in accordance with a manual operation.

In the following description, for the sake of simplification, it is assumed that a command value to stop the mechanical load 23 between cycles is output. In FIG. 2, the cycle start signal Cs and the cycle end signal Ce are pulse signals. They, however, may have other signal waveforms, e.g., the cycle start may be indicated with a rising edge of a signal and the cycle end may be indicated with a falling edge of a signal.

When the controller 27 controls speed, the command value generator 29 may output a motor rotational speed command value.

The command value generator 29 can be implemented with a programmable device using a DSP or a microcomputer provided with a memory device such as a semiconductor memory.

The inverter 19 is made up of the below-described elements, and performs Pulse Width Modulation (PWM modulation) using a carrier wave Cw at frequency in accordance with carrier wave frequency instruction value F output from a parameter selection/instruction unit 83.

The details of the configuration and the exemplary operation of the inverter are described in NPL 1, for example. An exemplary method for PWM modulation using variable carrier wave frequency is described in PTL 2. In PTL 2, carrier waves are called carrier.

The reference numeral 41 denotes a power controller which controls the voltage and the electric current from the DC bus 15 to the motor 21 using a power control device whose conduction state is changed with a gate signal. The power controller 41 assumed in the present embodiment uses the power control device capable of arc suppression by turning off a gate signal, such as a power Metal-Oxide-Semiconductor Field-Effect Transistor (power MOSFET) or an Insulated Gate Bipolar Transistor (IGBT), but may use other types of power control devices such as Gate Turn Off (GTO) in combination with an appropriate gate drive circuit depending on the used power control device.

The reference numeral 43 denotes a motor current measuring device which measures an electric current in each of UVW phases from the DC bus 15 to the motor 21. The motor current measuring device 43 may be a non-contact type device that measures magnetic field generated around a wire by an electric current, or may be a device including a resistor inserted in the circuit so as to measure voltage difference generated across the resistor by an electric current, for example. A current measuring device 63 may be implemented in the same manner.

The reference numeral 45 denotes a command calculator which outputs a modulation wave Mw for each phase of UVW to a PWM modulator 47 so that the motor 21 can generate torque in accordance with a torque command value Tc from the controller 27. The command calculator 45 may be a device configured to generate a modulation wave for each phase by comparing a current command for each phase calculated by vector operation with a value measured by the motor current measuring device 43, but may be other devices. The command calculator 45 can be implemented with a programmable device using a DSP or a microcomputer, or with an electronic circuit or with a combination thereof. By using a method of state estimation or the like, the number of components required in the motor current measuring devices 43 can be reduced.

The reference numeral 47 denotes a PWM modulator which modulates a modulation wave Mw with a carrier wave Cw and outputs a notch wave Nw that decides whether to turn on or turn off the power control device. The PWM modulator 47 assumed in the present embodiment is means using a triangular carrier wave and deciding ON/OFF of a notch wave Nw by comparison of the magnitude between the modulation wave Mw and the carrier wave Cw. The PWM modulator 47 can be implemented with an analog electronic circuit (comparator) or with a program using a DSP or a microcomputer.

The reference numeral 49 denotes a carrier wave oscillator which generates a carrier wave Cw for PWM modulation. The carrier wave oscillator 49 is configured so as to make oscillation frequency variable in accordance with carrier wave frequency instruction value F.

The carrier wave oscillator 49 can be configured such that an up-down counter repeating count up-down between two values of M1 and M2 is constituted by an electronic circuit or by a program using a DSP or a microcomputer to generate triangular carrier waves, and the values of M1 and M2 are changed appropriately in accordance with a carrier wave frequency instruction value F to change oscillation frequency. The carrier wave oscillator 49 may be configured by another method of, for example, using an oscillation circuit of an analogue electronic circuit.

The reference numeral 51 denotes a gate drive circuit which performs insulation, level conversion or amplification of a notch wave Nw, and outputs a gate signal $G_s$ to drive a gate of a power control device. The gate drive circuit 51 can be implemented with an electronic circuit using an insulation power source, a photocoupler or the like.

The reference numeral 61 denotes a voltage measuring device, and 63 denotes a current measuring device. The voltage measuring device 61 and the current measuring device 63 measure the voltage and the electric current, respectively, for calculating an amount of electric power W flowing from the battery 91 to the DC-DC converter 93, and output a measured voltage value V(t) and a measured current value I(t) to an electric power amount calculator 81. The measured voltage value V(t) and the measured current value I(t) are conveyed by means of analogue signal in the form of voltage amplitude or current amplitude or by means of digital signal using various communication networks.

The voltage on the positive side with respect to the negative side of the battery 91 at a time t measured by the voltage measuring device 61 is denoted as V(t). The electric current flowing from left to right in the drawing on the positive side of the battery 91 at a time t measured by the current measuring device 63 is denoted as I(t). A negative measured current value indicates that an electric current flows from right to left in the drawing.

The reference numeral 81 denotes an electric power amount calculator which calculates an electric power amount W in one cycle. That is, the electric power amount calculator 81 performs time integration of a value obtained by multiplying the measured voltage value V(t) by the measured current value I(t) from the time when the cycle start signal Cs is input to the time when the cycle end signal Ce is input, and outputs the result. The electric power amount W in one cycle can be conveyed by means of analogue signal in the form of voltage amplitude or current amplitude or by means of digital signal using various communication networks.

The electric power amount calculator 81 can be implemented with a programmable device using a DSP or a microcomputer, with an analogue electronic circuit, or with a combination thereof.

The electric power amount calculator 81 performs calculation as follows.

Electric power P(t) at a time t is the product of the voltage and the electric current which can be represented by Expression (1). Herein, a positive value of P(t) indicates that electric power flows from left to right in the drawing, and a negative value of P(t) indicates that electric power flows from right to left in the drawing.

$$P(t)=V(t)\times I(t) \quad (1)$$

Since the electric power amount W in one cycle is obtained by time integration of electric power, the electric power amount W in one cycle can be represented by Expression (2) in Numerical Expression 1, where T1 is a time of a cycle start signal for the cycle, and T2 is a time of a cycle end signal for the cycle.

[Numerical Expression 1]

$$W=\int_{T1}^{T2} P(t)dt \quad (2)$$

In the case where the calculation by the electric power amount calculator 81 is performed at a time interval of ΔT, the electric power amount W in one cycle is obtained by approximating Expression (2) by discretization and performing summation of V(t)×I(t)×ΔT from time T1 to time T2. That is, the electric power amount in one cycle for the cycle can be output at the time of the cycle end.

As described above, negative values are also permitted for the measured current value and the electric power, whereby the present invention is applicable to the case of the mixture of power running and regeneration in one cycle as well. The positive and negative values of electric power correspond to power running and regeneration, respectively.

The reference numeral 83 denotes a parameter selection/instruction unit which outputs an instruction for a parameter value influencing the amount of loss, while selecting an appropriate parameter value on the basis of the electric power amount for one cycle in each cycle. In the present embodiment, the parameters are frequency of carrier wave Cw and the output voltage of the DC-DC converter. The parameter selection/instruction unit 83 outputs a carrier wave frequency instruction value F to the carrier wave oscillator 49 and outputs an output voltage instruction value G to the DC-DC converter control circuit 95. The parameter selection/instruction unit 83 can be implemented with a programmable device using a DSP or a microcomputer.

Figure 3:
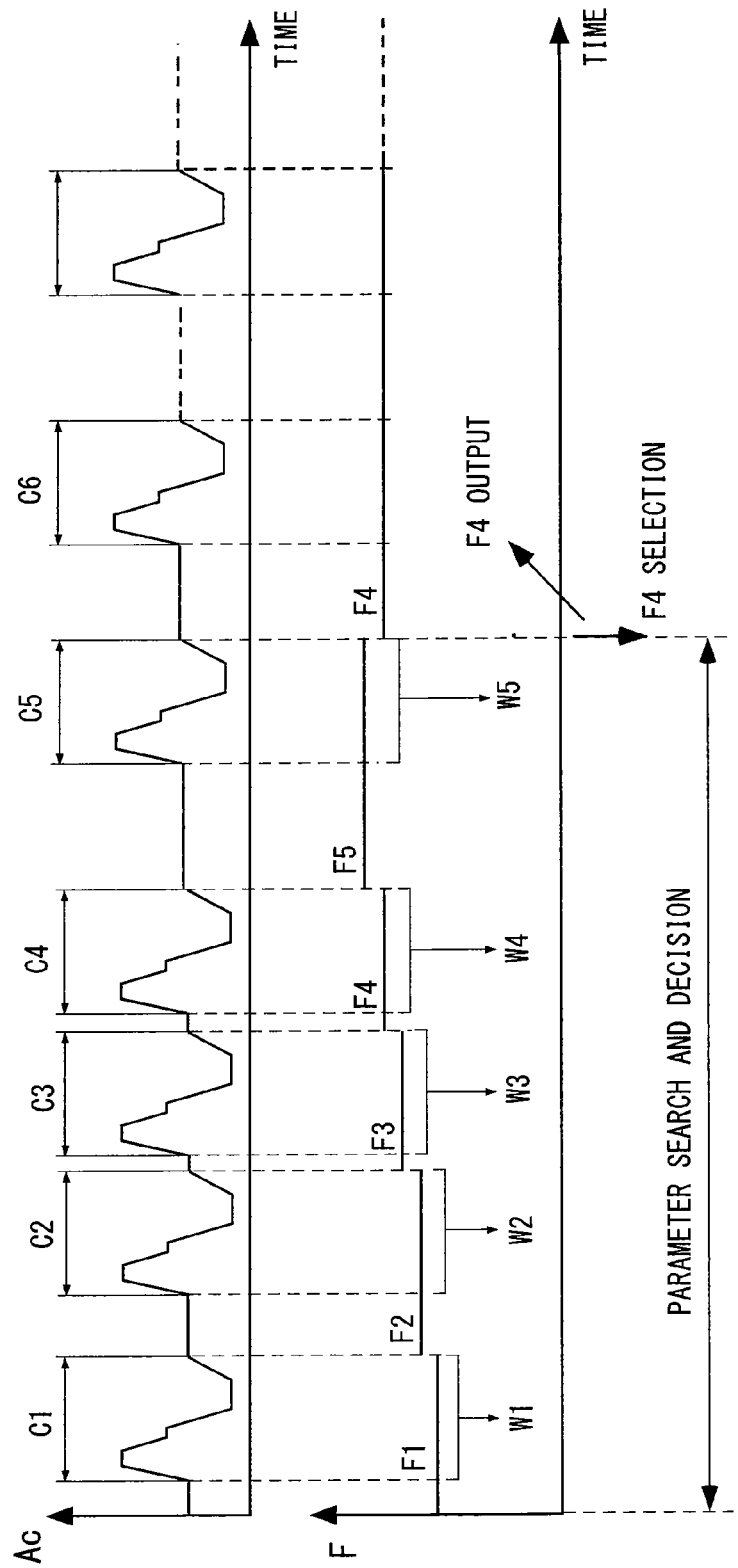
FIG. 3 illustrates an operation by a parameter selection/instruction unit.

FIG. 3 illustrates an operation by the parameter selection/instruction unit 83.

The following will describe a case where the output voltage instruction value G supplied to the DC-DC converter control circuit 95 is constant.

The parameter selection/instruction unit 83 searches for and decides a parameter to reduce the loss as follows.

The parameter selection/instruction unit 83 outputs a different carrier wave frequency instruction value F for each cycle. Since the electric power amount calculator 81 outputs an electric power amount W in one cycle for each cycle at the time of the cycle end, the parameter selection/instruction unit 83 stores the electric power amount W therein. The parameter selection/instruction unit 83 compares the stored electric power amounts W in one cycle, and outputs a carrier wave frequency instruction value F minimizing the electric power amount as the carrier wave frequency instruction value F to be used from then on.

For instance, as illustrated in FIG. 3, it is assumed that the carrier wave frequency instruction value F is changed to be F1, F2, F3, F4 and F5 respectively for five cycles (in the drawing, C1, C2, C3, C4 and C5), and the electric power amounts in one cycle are W1, W2, W3, W4 and W5 for the respective cycles. The electric power amounts W1, W2, W3, W4 and W5 are stored, and when cycle 5 (in the drawing, C5) ends, comparison is made. If W4 is the smallest, it can be understood that the carrier wave frequency instruction value F4 corresponding to W4 is the carrier wave frequency instruction value minimizing the loss. Accordingly, subsequently, the parameter selection/instruction unit 83 continues to output F4 as the carrier wave frequency instruction value.

In the example of FIG. 3, the carrier wave frequency instruction value F is changed to be five values F1 to F5, and five cycles of C1 to C5 are required for searching for and deciding a parameter (carrier wave frequency instruction value). However, the number of the carrier wave frequency instruction values F being changed is not limited to five, and may be the number Q of two or greater. In this case, Q cycles will be required for searching for and deciding a parameter (carrier wave frequency instruction value).

As for the timing when a parameter is searched for and decided, the following (1) and (2) can be considered, for example.

(1) A parameter may be searched for and decided immediately after a change of hardware that influences the loss, such as addition of a noise filter to the wiring from the inverter to the motor, replacement of the motor, alteration of the mechanical load 23 and the like. For instance, a push button (not illustrated) may be connected to the parameter selection/instruction unit 83, and a human operator may push the button when hardware change is made. After the button is pushed, the parameter selection/instruction unit 83 searches for and decides a parameter (carrier wave frequency instruction value in this example) in the initially conducted cycles (the first five cycles in this example), and subsequently continues to output the decided carrier wave frequency instruction value.

(2) A parameter may be searched for and decided again when a predetermined number of cycles or a predetermined time has elapsed, after the start of device operation. For instance, a counter counting the number of occurrence of the cycle start signal or the cycle end signal, or a timer measuring the elapsed time is provided in the parameter selection/instruction unit 83, and when the value of the counter or the value of the timer reaches a predetermined value, a parameter is searched for and decided again. At the same time, the counter or the timer is reset to restart counting of the cycle number or measurement of elapsed time.

In FIG. 1, the parameter selection/instruction unit 83 has a function of outputting the output voltage instruction value G to the DC-DC converter control circuit 95, in addition to the aforementioned carrier wave frequency instruction value F.

The following will describe a case where the carrier wave frequency instruction value F and the output voltage instruction value G can be changed.

In this case, the carrier wave frequency instruction value F and the output voltage instruction value G output by the parameter selection/instruction unit 83 are changed, and the electric power amounts W in one cycle are stored and compared, and then a carrier wave frequency instruction value F and the output voltage instruction value G that minimize the electric power amount W are output as the carrier wave frequency instruction value F and the output voltage instruction value G to be used thereafter.

Figure 4:
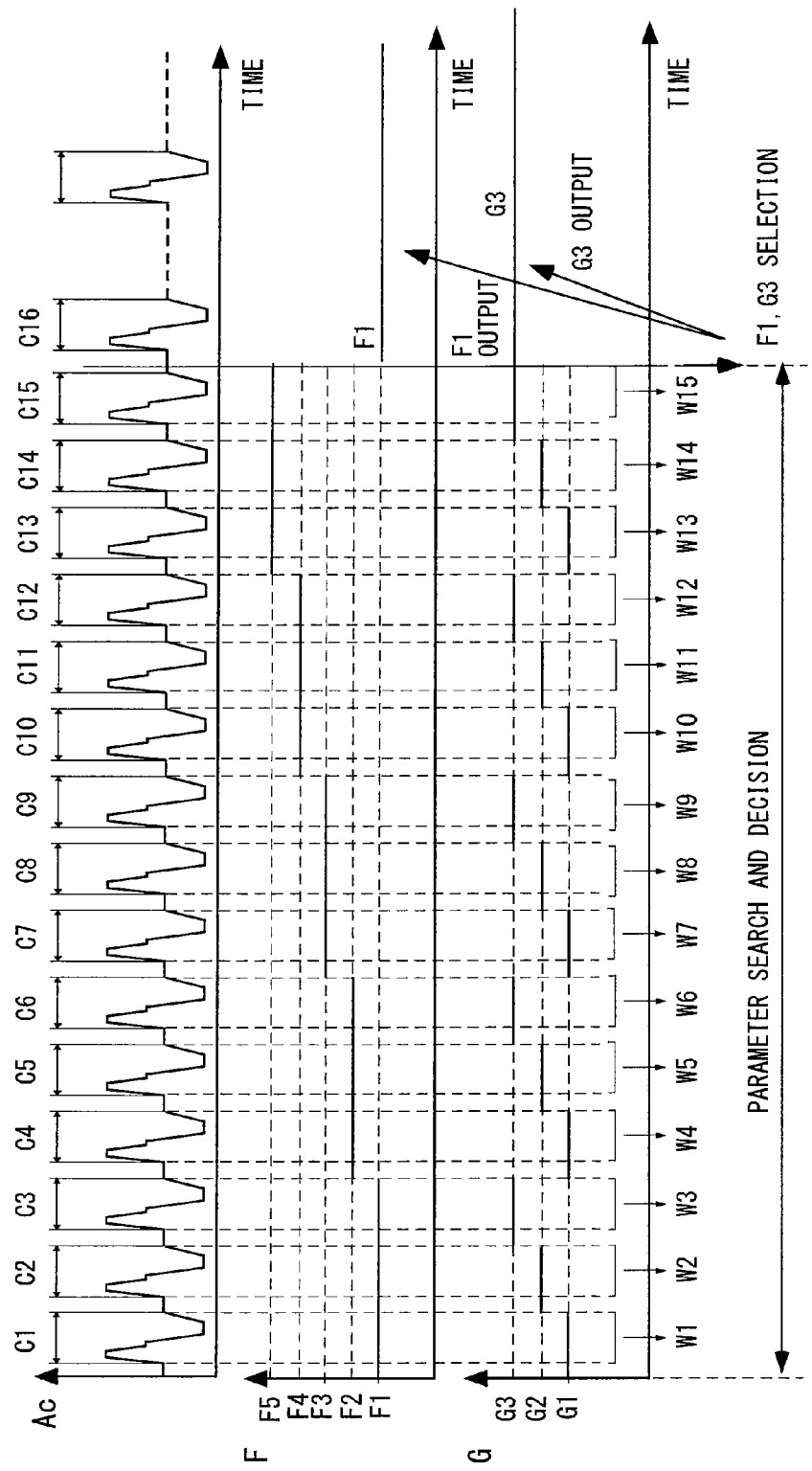
FIG. 4 illustrates a method of searching/deciding of parameters.

FIG. 4 illustrates a method for searching for and deciding a plurality of parameters.

The following method is available, for example, to search for and decide a plurality of parameters (the carrier wave frequency instruction value F and the output voltage instruction value G) reducing the loss.

Electric power amounts in one cycle are stored and compared for all of the combinations of the carrier wave frequency instruction values F and the output voltage instruction values G. For instance, in the case where the carrier wave frequency instruction value F are changed to be five values of F1, F2, F3, F4 and F5, and the output voltage instruction value G are changed to be three values of G1, G2 and G3, electric power amounts in one cycle (in the drawing, W1 to W15) for 5×3=15 cycles as illustrated in FIG. 4 (in the drawing, C1 to C15) are stored and compared, and the carrier wave frequency instruction value F and the output voltage instruction value G are selected. FIG. 4 illustrates the case where W3 is the smallest among W1 to W15, and therefore it can be understood that the combination of the carrier wave frequency instruction value F1 and the output voltage instruction value G3 corresponding to W3 is the combination of the carrier wave frequency instruction value and the output voltage instruction value that minimizes the loss. Thus, the parameter selection/instruction unit 83 continues to output F1 as the carrier wave frequency instruction value and G3 as the output voltage instruction value after the end of cycle 15 (i.e., at and after the cycle C16 in the drawing).

In the example of FIG. 4, the carrier wave frequency instruction value F is changed to be five values of F1 to F5, and the output voltage instruction value G is changed to be three values of G1 to G3, and 5×3=15 cycles (in the drawing, C1 to C15) are required for searching for and deciding of parameters (carrier wave frequency instruction value and output voltage instruction value). However, the number of the carrier wave frequency instruction values F being changed and the number of the output voltage instruction values G being changed are not limited to 5 and 3, respectively, and may be the numbers Q and R of 2 or greater, respectively. In this case, Q×R cycles will be required for searching for and deciding parameters (a carrier wave frequency instruction value F and an output voltage instruction value G).

In the above-described method, if the combinations of parameter values (in the above example, 15 combinations) become too many and the number of cycles required for searching for and deciding parameters becomes too large, combinations of parameters to be used may be selected from the combinations of the parameters by using random numbers or genetic algorithm. Other methods based on experimental design may be used.

Embodiment 2

Figure 5:
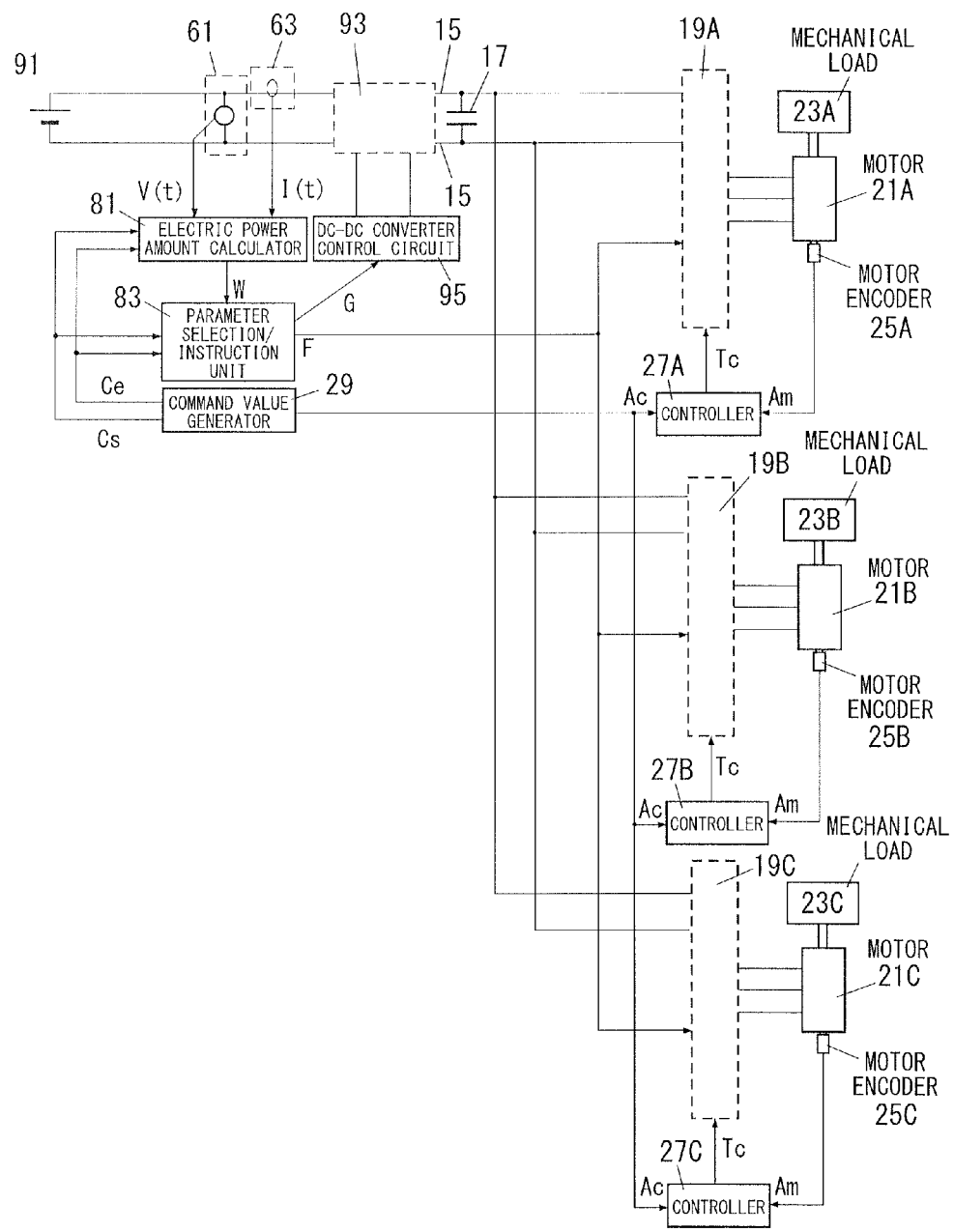
FIG. 5 illustrates a power-saving driving device of Embodiment 2 according to the present invention.

FIG. 5 illustrates a power-saving driving device of Embodiment 2 according to the present invention.

In this embodiment, a plurality of inverters and motors are provided, and they operate in the same motion. For instance, this is the case where a plurality of motors drive and share one and the same mechanical load because the size of a motor is limited.

FIG. 5 illustrates the case of three inverters and motors, and the same applies to the case of two of them or four or more of them. In FIG. 5, the internal configurations of the DC-DC converter and the inverters are the same as those in Embodiment 1, so that the internal configurations of the DC-DC converter and the inverters are not shown in the drawings.

Since the following elements are provided for each inverter and motor, these elements are identified with letters A, B and C attached at the end of description for each inverter and motor. The configuration of each element is the same as in Embodiment 1.

19A, 19B, 19C inverter
21A, 21B, 21C motor
23A, 23B, 23C mechanical load
25A, 25B, 25C motor encoder
27A, 27B, 27C controller Since the three sets, distinguished with letters A, B and C attached to their descriptions, operate completely identically, only one parameter selection/instruction unit 83 is provided, and parameters (carrier wave frequency instruction value F and output voltage instruction value G) for the sets are made always identical.

Since the voltage measurement device 61 and the current measurement device 63 are connected so as to measure the total amount of electric power W of the three sets, the same electric power amount calculation and parameter searching/decision operation as in Embodiment 1 allow parameters (carrier wave frequency instruction value F and the output voltage instruction value G) to be searched for and decided so as to reduce the total loss for the three sets.

According to the device and the method in accordance with Embodiment 1 or Embodiment 2 of the present invention described above, an electric power amount calculator 81 and a parameter selection/instruction unit 83 are provided to change a parameter of the inverter 19 to be a plurality of values, the received electric power amounts W of the inverter in the same load pattern corresponding to the values of the parameter are calculated for each parameter and compared with one another to select the parameter value that minimizes the received electric power amount, and then the selected parameter is instructed to the inverter. Thus, the amount of loss can be minimized with consideration given to loss characteristics of all constituting elements and without obtaining data on loss characteristics by previously performing experiment for electric characteristics of the wiring, the presence or absence of a device for electromagnetic noise removal, loss characteristics and a temperature change of each motor and the like.

Embodiment 3

Figure 6:
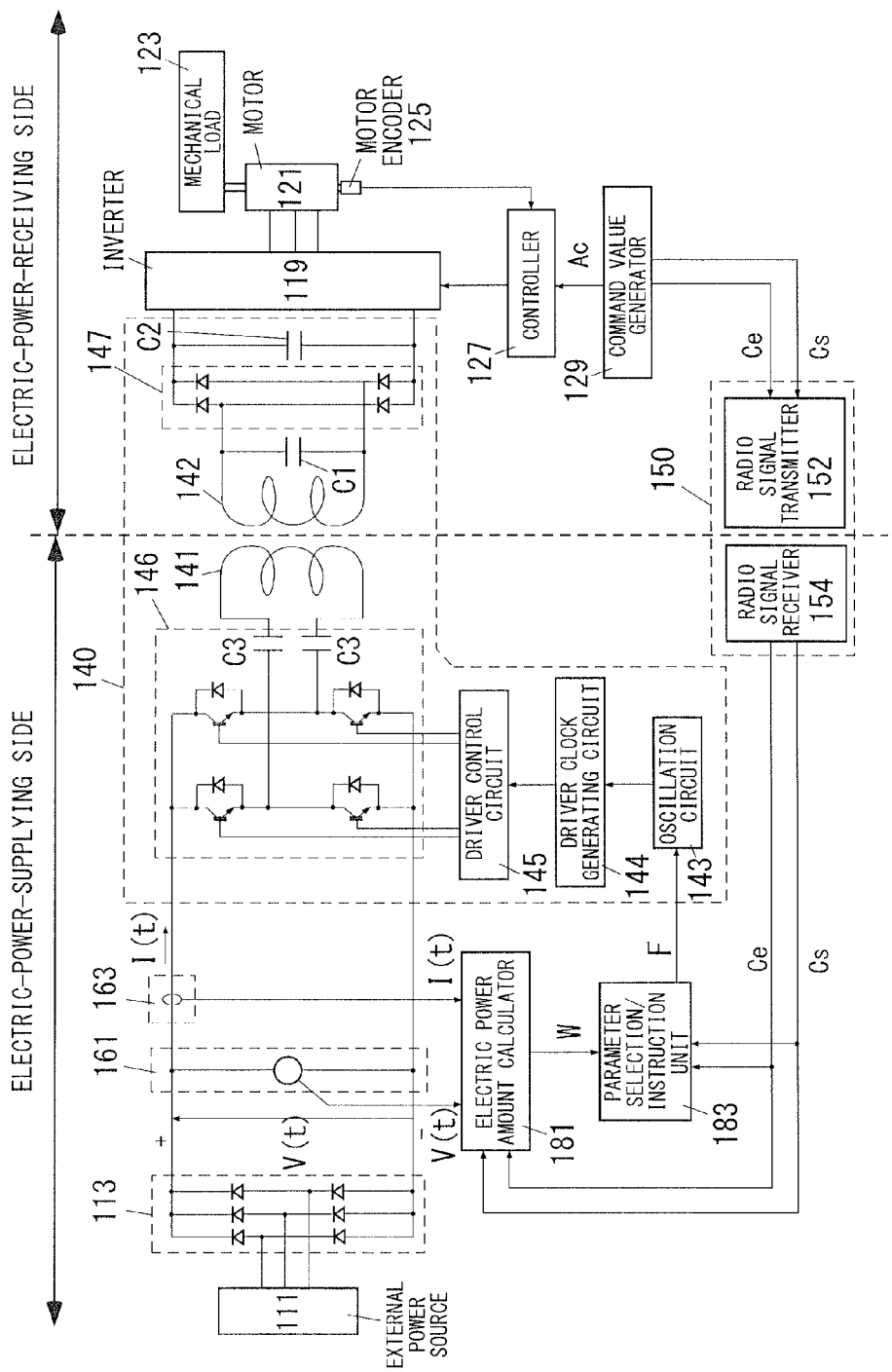
FIG. 6 illustrates a power-saving driving device of Embodiment 3 according to the present invention.

FIG. 6 illustrates a power-saving driving device of Embodiment 3 according to the present invention.

In this drawing, the reference numeral 111 denotes an external power source, such as a power source receiving electric power from an electric power company or a private electric power generator. The external power source 111 in the present embodiment is assumed to supply three-phase alternating currents, but may be a different type of power source that supplies a single-phase alternating current, for example.

The reference numeral 113 denotes a converter which converts electric power supplied from the external power source 111 into a direct current and supplies the direct current to a wireless electric power transmission device 140. The converter 113 in the present embodiment is assumed to be formed of a diode bridge, but may alternatively use a thyristor bridge capable of changing a voltage by phase control, or use a power control device such as a power MOSFET or IGBT.

The reference numeral 119 denotes an inverter which controls the electric current and voltage flowing from the wireless electric power transmission device 140 to a motor 121 so that the motor 121 can generate desired torque. The inverter 119 assumed in the present embodiment is a voltage-type inverter, but may be a current-type inverter. In the case of a current-type inverter, a reactor is used instead of a capacitor at the output of the wireless electric power transmission device.

Further, the inverter 119 assumed in the present embodiment is a four-quadrant drive inverter enabling forward and reverse rotation, and power running and regeneration of the motor 121, but may be an inverter enabling a rotation direction only in one direction or an inverter enabling power running only, depending on the characteristics or the operation of a mechanical load 123 (same load pattern device).

The reference numeral 121 denotes a motor, and the combination of the inverter 119 and the motor 121 allows the motor 121 to generate a torque in accordance with a torque command value input from a controller 127.

The motor 121 assumed in the present embodiment is a three-phase induction motor or a three-phase permanent magnet synchronous motor, but may be of other types if torque/rotational speed can be changed by the combination with the inverter.

The reference numeral 123 denotes a mechanical load, i.e., a same load pattern device which is driven by the motor 121.

The reference numeral 125 denotes a motor encoder which measures a rotational position (angle) of the motor 121. The motor encoder 125 may be an optical or a magnetic rotary encoder or a resolver. When the controller 127 controls speed, the rotational speed (angular speed) of the motor 121 may be measured. In this case, time derivative of the rotational position measured by the rotary encoder or the resolver may be calculated, or the rotational speed may be directly measured by a tachometer.

The reference numeral 127 denotes a controller, and the inverter 119, the motor 121, the motor encoder 125 and the controller 127 constitute a feedback loop. Control is performed such that the motor 121 follows a command value from a command value generator 129.

The controller 127 assumed in the present embodiment controls a position, but may control speed. As a calculation method in the controller, Proportional Integral Derivative (PID) control or Integral Proportional Derivative (I-PD) control is often used, but other control methods may be used. Feedfoward calculation may be combined therewith to improve controllability. The controller 127 can be implemented with a programmable device using a Digital Signal Processor (DSP) or a microcomputer, or with an analogue circuit or with a combination thereof.

The reference numeral 129 denotes a command value generator which outputs a motor rotational angle command value Ac to be followed by the motor 121, to the controller 127 at respective times. The motor rotational angle command value Ac may be conveyed by a two-phase pulse string with a 90° phase shift or by various communication networks. Since the rotational angle of the motor 121 and the mechanical load 123 are mechanically connected with each other, commanding the rotational angle of the motor 121 is synonymous with commanding the position of the mechanical load 123.

The command value generator 129 can be implemented with a programmable device using a DSP or a microcomputer provided with a memory device such as a semiconductor memory.

The reference numeral 140 denotes the wireless electric power transmission device which receives a direct current, outputs a direct current, and transmits electric power from the supplying side to the electric-power-receiving side wirelessly.

In FIG. 6, the wireless electric power transmission device 140 is constituted by an electric-power-supplying circuit and an electric-power-receiving circuit.

The electric-power-supplying circuit in this example includes an electric-power-supplying antenna coil 141, an oscillation circuit 143, a drive clock generating circuit 144, a driver control circuit 145, and a driver 146.

The electric-power-receiving circuit in this example includes an electric-power-receiving antenna coil 142, a capacitor C1, a rectifier circuit 147 constituted by four rectifier diodes, and a smoothing capacitor C2. The electric-power-receiving antenna coil 142 and the capacitor C1 constitutes a resonance circuit.

The electric-power-supplying antenna coil 141 receives signals of arbitrary frequencies (oscillating frequencies) from the oscillation circuit 143, the drive clock generating circuit 144, the driver control circuit 145, and the driver 146.

When a signal of arbitrary frequency (oscillation frequency) is supplied to the electric-power-supplying antenna coil 141, an induced voltage is generated between the both ends of the electric-power-receiving antenna coil 142 due to electromagnetic coupling. The induced voltage is stored in the smoothing capacitor C2 through the rectifier circuit 147 and turned into a smoothed DC voltage which is supplied to the inverter 119.

The oscillation circuit 143 of the electric-power-supplying circuit is, for example, a circuit that generates a pulse having desired frequency. The oscillating operation of the oscillation circuit 143 is controlled by a parameter selection/instruction unit 183.

The drive clock generating circuit 144 is a circuit that generates a drive clock of certain frequency on the basis of an output of the oscillation circuit 143, and the frequency thereof is controlled by the parameter selection/instruction unit 183.

The driver control circuit 145 generates a signal that operates the driver 146 according to a drive clock generated by the drive clock generating circuit 144 and outputs the generated signal to the driver 146.

The driver 146 is a circuit which is constituted by a plurality of amplifiers and a capacitor C3 and drives a serial resonance circuit.

The following means are available for causing the oscillation circuit 143 to oscillate at frequency corresponding to an oscillation frequency instruction value.

(1) An output of a crystal oscillator having frequency that is much higher than the oscillation frequency is divided by a digital counter. The oscillation frequency can be changed by changing the value counted up by a counter.

(2) A digital PLL is used to constitute an oscillation circuit, and the counted-up value of a dividing counter of the PLL is changed.

(3) An analog oscillation circuit is constituted by devices such as varicap diodes in which the capacitance varies by voltages.

The reference numeral 150 denotes a radio signal communication channel which is constituted by a radio signal transmitter 152 and a radio signal receiver 154. In order to utilize the advantages of wireless electric power transmission, a cycle start signal Cs and a cycle end signal Ce are sent over the radio, eliminating the cable connection for sending signals between the electric-power-supplying side and the electric-power-receiving side. Other communication methods include a communication method of using radio waves such as wireless LAN, and a communication method in which a light emitting element and a light receiving element for sending signals are disposed such that they oppose each other, and the light is modulated for sending signals during the operation of wireless electric power transmission.

The reference numeral 161 denotes a voltage measuring device, and 163 denotes a current measuring device. The voltage measuring device 161 and the current measuring device 163 measure the voltage and the electric current, respectively, for calculating an amount of electric power flowing to the wireless electric power transmission device 140, and outputs a measured voltage value V(t) and a measured current value I(t) to an electric power amount calculator 181. The measured voltage value V(t) and the measured current value I(t) can be conveyed by means of analogue signal in the form of voltage amplitude or current amplitude or by means of digital signal using various communication networks.

The voltage on the positive side with respect to the negative side at a time t measured by the voltage measuring device 161 is denoted as V(t). The electric current flowing from left to right in the drawing on the positive side of a direct current at a time t measured by the current measuring device 163 is denoted as I(t). A negative measured current value indicates that an electric current flows from right to left in the drawing.

The reference numeral 181 denotes an electric power amount calculator which calculates an electric power amount W in one cycle. That is, the electric power amount calculator 181 performs time integration of a value obtained by multiplying the measured voltage value V(t) by the measured current value I(t) from the time when the cycle start signal Cs is input to the time when the cycle end signal Ce is input, and outputs the result. The electric power amount W in one cycle can be conveyed by means of analogue signal in the form of voltage amplitude or current amplitude or by means of digital signal using various communication networks.

The electric power amount calculator 181 can be implemented with a programmable device using a DSP or a microcomputer, or with an analogue electronic circuit, or with a combination thereof.

The electric power amount calculator 181 performs calculation as follows.

Electric power P(t) at a time t is the product of the voltage and the electric current which can be represented by Expression (3). Herein, a positive value of P(t) indicates that electric power flows from left to right in the drawing, and a negative value of P(t) indicates that electric power flows from right to left in the drawing.

$$P(t) = V(t) \times I(t) \quad (3)$$

Since the electric power amount W in one cycle is obtained by time integration of electric power, the electric power amount W in one cycle can be represented by Expression (4) in Numerical Expression 2, where T1 is the time of a cycle start signal for the cycle, and T2 is the time of a cycle end signal for the cycle.

[Numerical Expression 2]

$$W = \int_{T_1}^{T_2} P(t) dt \quad (4)$$

It is assumed that the calculation by the electric power amount calculator 181 is performed at a time interval of ΔT, and the electric power amount W in one cycle is obtained by approximating Expression (4) by discretization and performing summation of V(t)×I(t)×ΔT from time T1 to time T2. That is, the electric power amount in one cycle for the cycle can be output at the cycle end time.

As described above, negative values are also permitted for the measured current value and the electric power, whereby the present invention is applicable to the case of the mixture of power running and regeneration in one cycle as well. That is, positive and negative values of electric power correspond to power running and regeneration, respectively.

The reference numeral 183 denotes a parameter selection/instruction unit which outputs an instruction for a parameter value influencing the amount of loss, while selecting an appropriate parameter value on the basis of the electric power amount for one cycle in each cycle. In the present embodiment, the parameter is oscillation frequency of the wireless electric power transmission device, and the parameter selection/instruction unit 183 outputs an oscillation frequency instruction value F to the oscillation circuit 143. The parameter selection/instruction unit 183 can be implemented with a programmable device using a DSP or a microcomputer.

Figure 7:
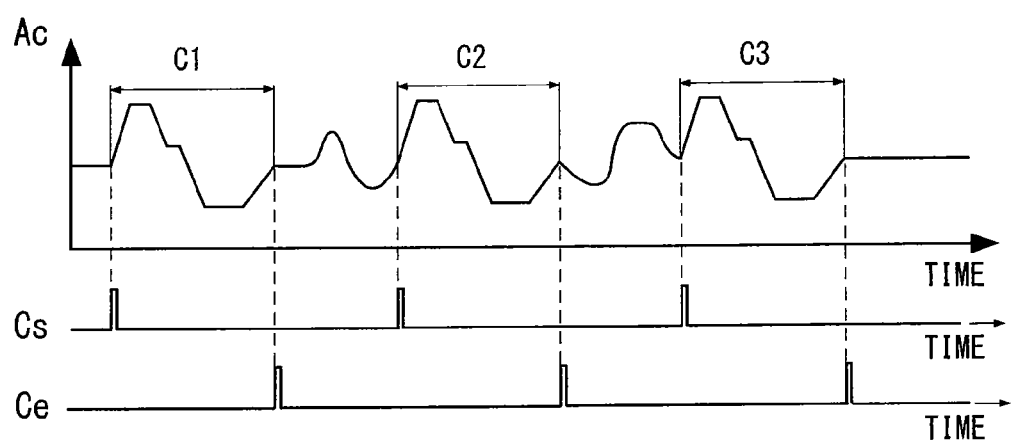
FIG. 7 illustrates an operation of a same load pattern device as a target for Embodiment 3 according to the present invention.

FIG. 7 illustrates an operation of the same load pattern device to which Embodiment 3 applies.

Since the present invention is intended for an device (same load pattern device) repeatedly operated in the same load pattern, in the present embodiment as illustrated in FIG. 7, the motor rotational angle command value Ac has a cycle (repeated same pattern), and a command value generator 129 outputs a cycle start signal Cs and a cycle end signal Ce at a starting time and an ending time of a cycle, respectively.

In FIG. 7, C1, C2 and C3 each represent a cycle. Any command value may be output between cycles, the command value being, for example, a command value to stop the mechanical load 123 or a command value to make the mechanical load 123 operate in accordance with a manual operation. As those command values do not affect the operation of the present invention, in the following description, a command value to stop the mechanical load 123 is assumed to be output between cycles for the sake of simplification.

In FIG. 7, the cycle start signal Cs and the cycle end signal Ce are pulse signals. They, however, may have other signal waveforms, e.g., the cycle start may be indicated with a rising edge of a signal and the cycle end may be indicated with a falling edge of a signal.

When the controller 127 controls speed, the command value generator 129 may output a motor rotational speed command value.

Figure 8:
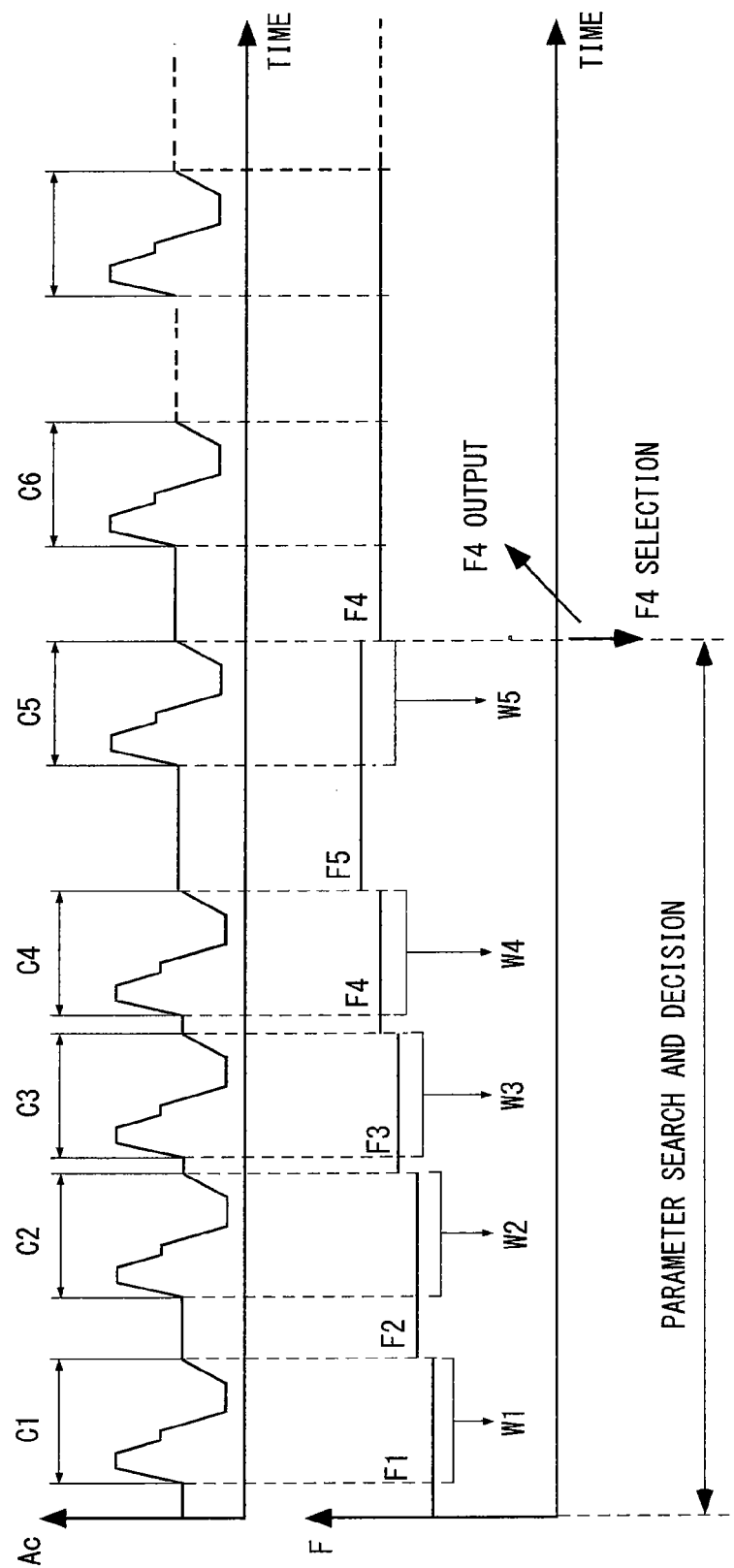
FIG. 8 illustrates an operation by a parameter selection/instruction unit 183 in Embodiment 3.

FIG. 8 illustrates an operation by the parameter selection/instruction unit 183.

The parameter selection/instruction unit 183 searches for and decides a parameter to reduce the loss as follows.

The parameter selection/instruction unit 183 outputs a different oscillation frequency instruction value F for each cycle. Since the electric power amount calculator 181 outputs an electric power amount W in one cycle for each cycle at the time of the cycle end, the parameter selection/instruction unit 183 stores the electric power amount W therein. The parameter selection/instruction unit 183 compares the stored electric power amounts W in one cycle, and outputs an oscillation frequency instruction value F minimizing the electric power amount as the oscillation frequency instruction value F to be used from then on.

For instance, as illustrated in FIG. 8, it is assumed that the oscillation frequency instruction value F is changed to be F1, F2, F3, F4 and F5 respectively for five cycles (in the drawing, C1, C2, C3, C4 and C5), and the electric power amounts in one cycle are W1, W2, W3, W4 and W5 for the respective cycles. The electric power amounts W1, W2, W3, W4 and W5 are stored, and when the cycle 5 (in the drawing, C5) ends, comparison is made. If W4 is the smallest, it can be understood that the oscillation frequency instruction value F4 corresponding to W4 is the oscillation frequency instruction value minimizing the loss. Accordingly, subsequently, the parameter selection/instruction unit 183 continues to output F4 as the oscillation frequency instruction value.

In the example of FIG. 8, the oscillation frequency instruction value F is changed to be five values F1 to F5, and five cycles of C1 to C5 are required for searching for and deciding a parameter (oscillation frequency instruction value). However, the number of the oscillation frequency instruction values F being changed is not limited to five, and may be the number Q of 2 or greater. In this case, Q cycles will be required for searching for and deciding a parameter (oscillation frequency instruction value).

As for the timing when a parameter is searched for and decided, the following (1) through (3) can be considered, for example.

(1) In the case where the relative positional relationship between the electric-power-supplying antenna coil and the electric-power-receiving antenna coil is changed.

Typically, for example, when a mobile body moves and then stops again in the case where the electric-power-receiving antenna coil is mounted on the mobile body and the electric power transmission is performed while the mobile body is stopped.

(2) In the case of an environmental condition such as the temperature of a circuit element is changed, the environmental condition causing a change in resonance frequency.

For example, a thermometer or the like may be used to actually measure a change in the environmental condition and if the change exceeds a predetermined value, then a parameter may be searched for and decided, or the parameter may be searched for and decided again when a predetermined number of cycles is performed or predetermined time elapses.

As a method for implementing the latter, for example, a counter counting the number of occurrence of the cycle start signal or the cycle end signal, or a timer measuring the elapsed time is provided in the parameter selection/instruction unit, and when the value of the counter or the value of the timer reaches a predetermined value, a parameter is searched for and decided again. At the same time, the counter or the timer may be reset to restart counting of the cycle number or measurement of elapsed time.

(3) In the case where the present invention is applied to a device having a plurality of operation patterns (e.g., a transport device that conveys a plurality of objects and the transport trajectory thereof changes according to an object), a parameter is searched for and decided immediately after an operation pattern is switched. For instance, a controller (not illustrated) instructing the switching of operating patterns is configured to notify the switching of operating patterns to the parameter selection/instruction unit, and when the parameter selection/instruction unit is notified of the switching of operating patterns, the parameter selection/instruction unit may search for and decide a parameter.

The timing for carrying out the search and decision of a parameter may be determined by a combination of the timings described above. The above descriptions refer to examples, and the timing of the parameter search and decision is not limited thereto.

Figure 9:
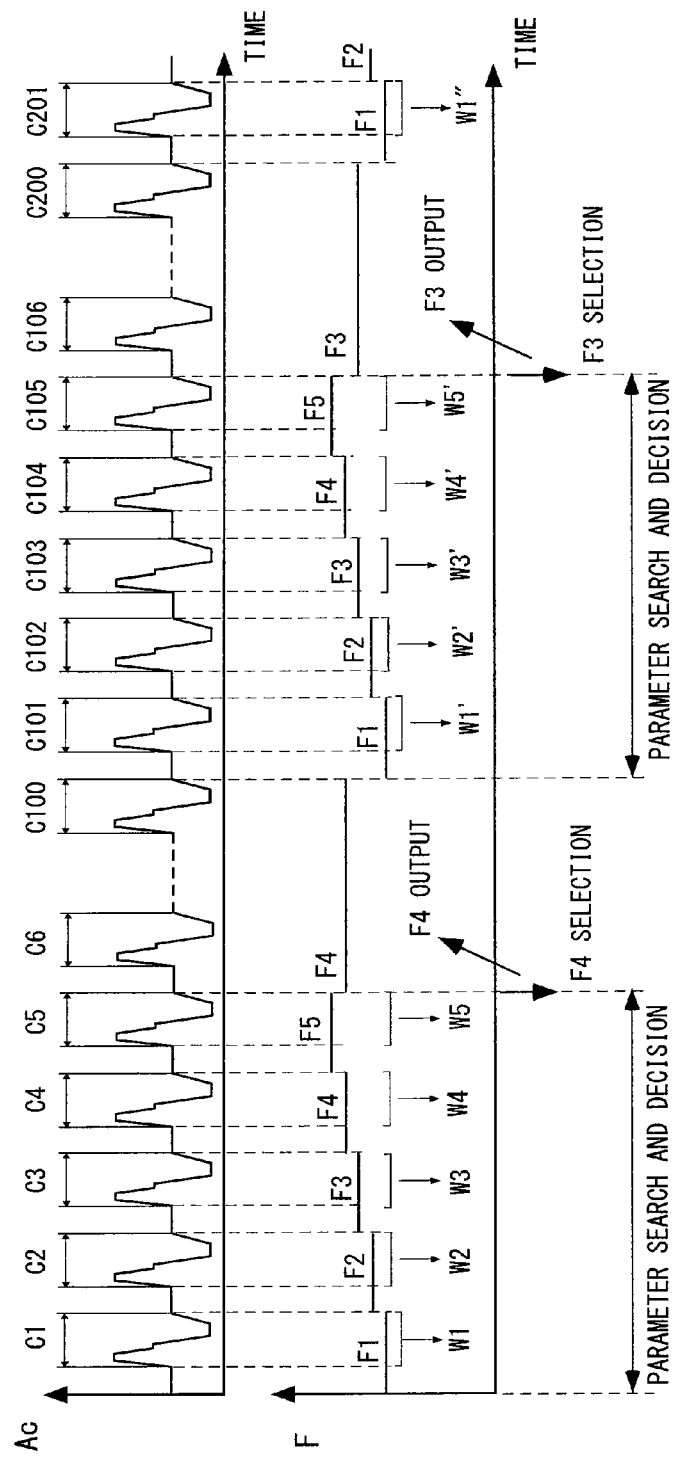
FIG. 9 illustrates an example where a parameter is repeatedly searched for and decided every 100 cycles.

FIG. 9 illustrates an example where a parameter is searched for and decided again every 100 cycles.

In this example, the oscillation frequency instruction value is changed as illustrated in FIG. 9. It is assumed that the oscillation frequency instruction value F is changed to be F1, F2, F3, F4 and F5 respectively for the first five cycles (in the drawing, C1, C2, C3, C4 and C5), and the electric power amounts in one cycle are W1, W2, W3, W4 and W5 for the respective cycles. The electric power amounts W1, W2, W3, W4 and W5 are stored, and when the cycle 5 (in the drawing, C5) ends, comparison is made. If W4 is the smallest, it can be understood that the oscillation frequency instruction value F4 corresponding to W4 is the oscillation frequency instruction value minimizing the loss at that point of time. Accordingly, subsequently, the parameter selection/instruction unit 183 continues to output F4 as the oscillation frequency instruction value until 100 cycles are performed (i.e., for cycles C6 through C100).

After 100 cycles are performed, it is assumed that the oscillation frequency instruction value F is changed again to be F1, F2, F3, F4 and F5 respectively for five cycles (in the drawing, C101, C102, C103, C104 and C105), and the electric power amounts in one cycle are W1', W2', W3', W4' and W5' for the respective cycles. The electric power amounts W1', W2', W3', W4' and W5' are stored, and when the cycle 105 (in the drawing, C105) ends, comparison is made. If W3' is the smallest, it can be understood that the oscillation frequency instruction value F3 corresponding to W3' is the oscillation frequency instruction value minimizing the loss at that point of time. Accordingly, subsequently, the parameter selection/instruction unit 183 continues to output F3 as the oscillation frequency instruction value until another 100 cycles are performed (i.e., for cycles C106 through C200).

Subsequently, the above operation is repeated every 100 cycles. Note here that FIG. 9 illustrates the first 201 cycles (in the drawing, C1 through C201).

If a change in the temperature around the device, or the heat of the device generated by a continued operation of the device leads to a change in the temperature of a circuit device or the like to cause a change in the resonance frequency of the resonance circuit, then a parameter (the oscillation frequency in the present embodiment) that enables the wireless electric power transmission device to most efficiently transmit electric power may change accordingly. However, repeatedly searching for and deciding the oscillation frequency instruction value makes it possible to always operate the wireless electric power transmission device with a parameter (the oscillation frequency) that permits the transmission of electric power with highest efficiency.

Figure 10:
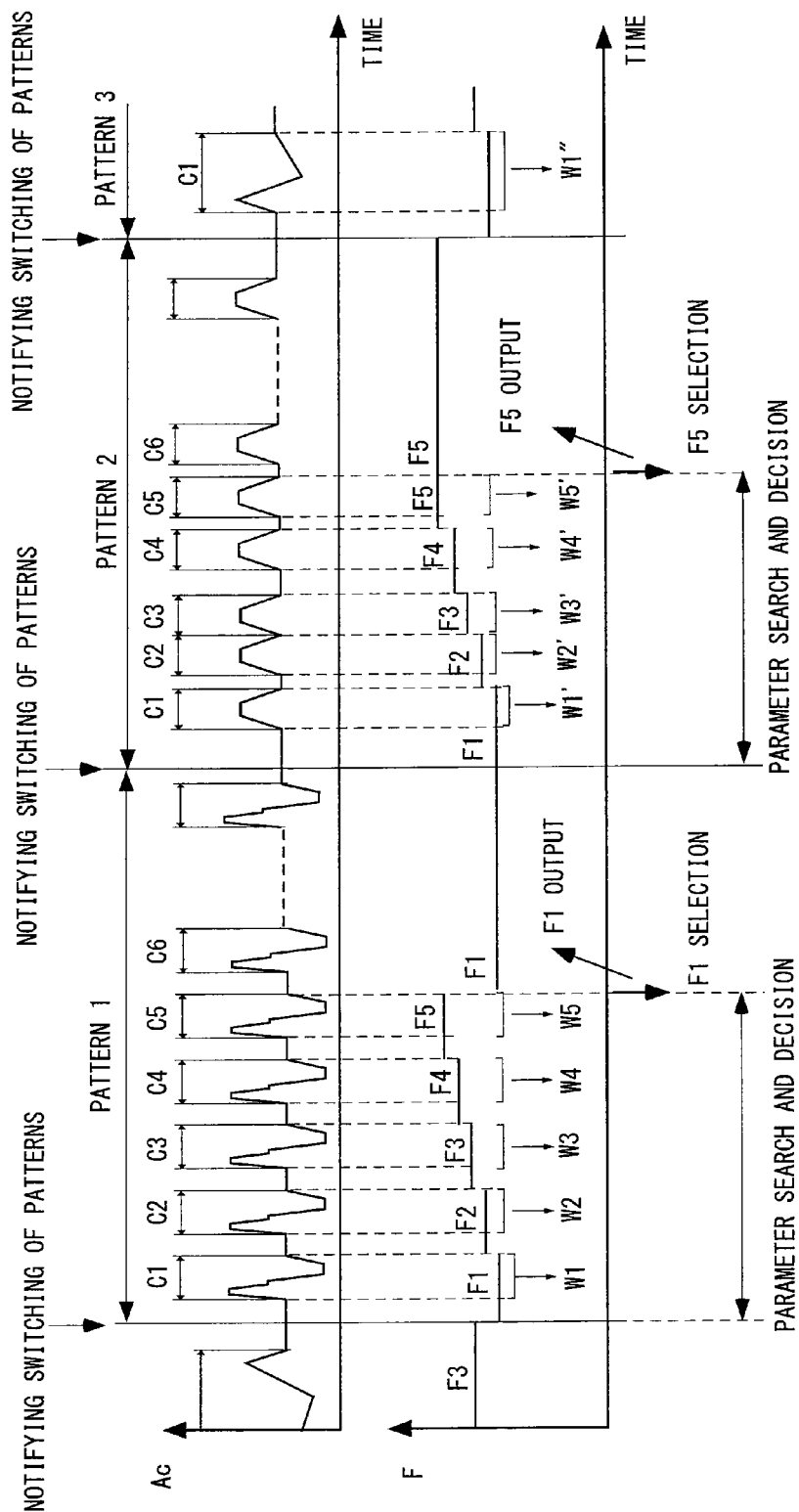
FIG. 10 illustrates the example where a parameter is repeatedly searched for and decided again in a device having a plurality of operating patterns.

FIG. 10 illustrates an example where a parameter is searched for and decided again in a device having a plurality of operating patterns.

It is assumed that the oscillation frequency instruction value F is changed to be F1, F2, F3, F4 and F5 respectively for the first five cycles operated in the pattern 1 (in the drawing, C1, C2, C3, C4 and C5), and the electric power amounts in one cycle are W1, W2, W3, W4 and W5 for the respective cycles. The electric power amounts W1, W2, W3, W4 and W5 are stored, and when the cycle 5 (in the drawing, C5) ends, comparison is made. If W1 is the smallest, it can be understood that the oscillation frequency instruction value F1 corresponding to W1 is the oscillation frequency instruction value minimizing the loss for the pattern 1. Accordingly, subsequently, the parameter selection/instruction unit 183 continues to output F1 as the oscillation frequency instruction value during the operation in the pattern 1.

It is assumed that when the operating pattern switches to the pattern 2, the oscillation frequency instruction value F is changed to be F1, F2, F3, F4 and F5 respectively for the first five cycles operated in the pattern 2 (in the drawing, C1, C2, C3, C4 and C5), and the electric power amounts in one cycle are W1', W2', W3', W4' and W5' for the respective cycles. The electric power amounts W1', W2', W3', W4' and W5' are stored, and when the cycle 5 (in the drawing, C5) ends, comparison is made. If W5' is the smallest, it can be understood that the oscillation frequency instruction value F5 corresponding to W5' is the oscillation frequency instruction value minimizing the loss for the pattern 2. Accordingly, subsequently, the parameter selection/instruction unit 183 continues to output F5 as the oscillation frequency instruction value during the operation in the pattern 2.

Embodiment 4

Figure 11:
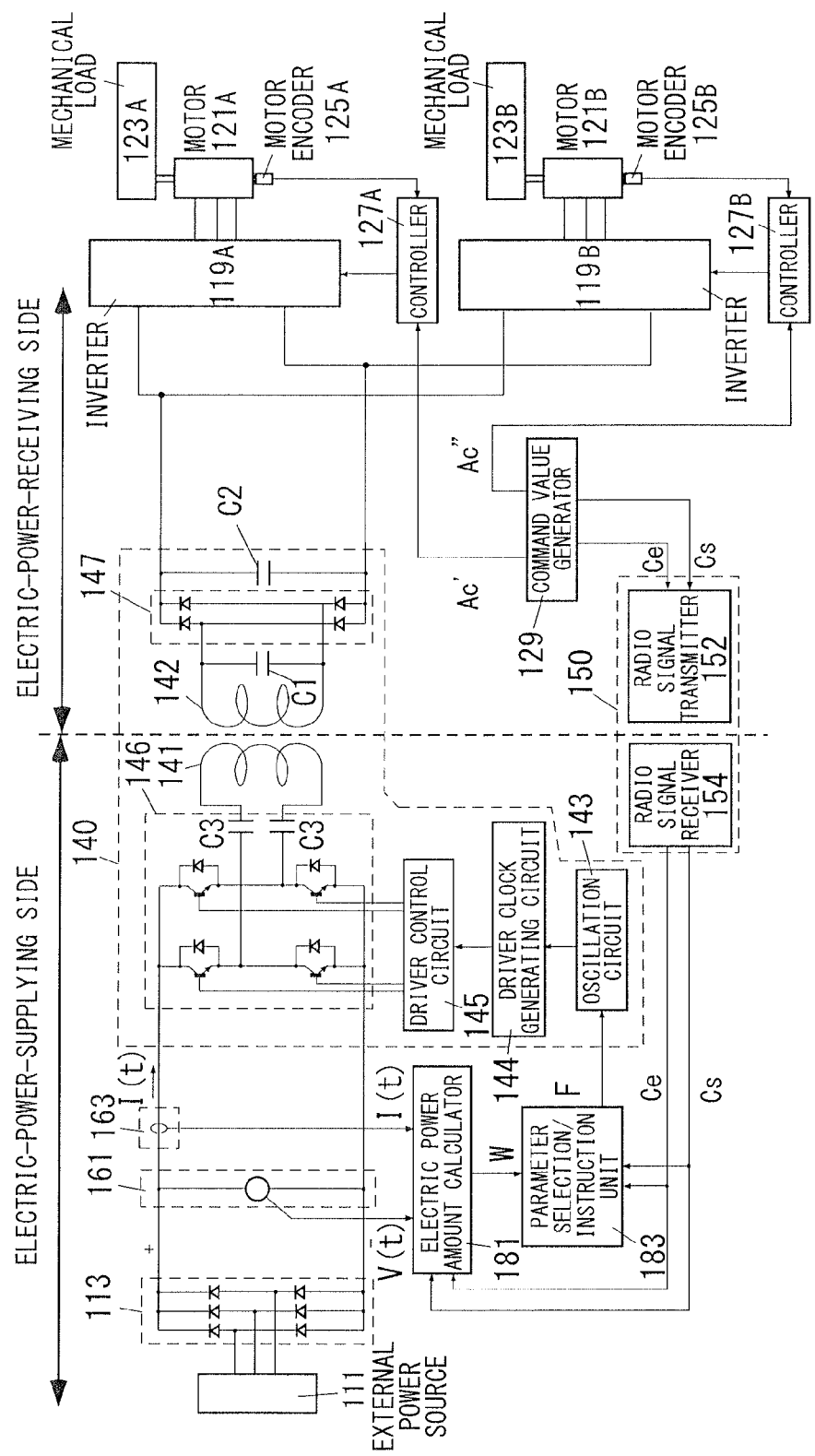
FIG. 11 illustrates a power-saving driving device of Embodiment 4 according to the present invention.

FIG. 11 illustrates a power-saving driving device of Embodiment 4 according to the present invention.

In this example, a plurality of inverters and motors are provided, and at predetermined time, a command value generator 129 outputs a motor rotational angle command value Ac' to be followed by a motor 121A, to a controller 127A, and outputs a motor rotational angle command value Ac" to be followed by a motor 121B, to a controller 127B. The operations of the plurality of motors may be any one of the following.

(1) All the motors operate in the same motion. This is represented by, for example, the case where the size of a motor is limited, and accordingly, a plurality of motors drive and share one and the same mechanical load. In this case, the motor rotational angle command value Ac' to be followed by the motor 121A and the motor rotational angle command value Ac" to be followed by the motor 121B may be always set to the same value.

(2) Each motor operates differently. This is represented by, for example, the case of a multi-joint robot equipped with motors for driving respective joints. In this case, the motor rotational angle command value Ac' to be followed by the motor 121A and the motor rotational angle command value Ac" to be followed by the motor 121B will be usually set to different values.

The drawing illustrates an example in which two inverters and two motors are provided in Embodiment 3. This example illustrates the case where two inverters and two motors are provided, but the number of each thereof may be three or more.

Since the following elements are provided for each inverter and motor, these elements are identified with letters A and B attached at the end of description for each inverter and motor. The configuration of each element is the same as in Embodiment 3.

119A, 119B inverter
121A, 121B motor
123A, 123B mechanical load
125A, 125B motor encoder
127A, 127B controller The electric power is supplied to the two sets, distinguished by letters A and B, via a single wireless electric power transmission device, so that the same electric power amount calculation and the same parameter search and decision as those in Embodiment 3 are performed so as to search for and decide a parameter (the oscillation frequency instruction value F) that reduces the total loss of the two sets.

The present invention is not limited to the above described embodiments, is defined by the description in the claims, and includes all modifications within the range of the description in the claims and within the meaning equivalent to the description in the claims.

For example, the parameter may be selected for each of a plurality of intervals in the same load pattern.

Further, the parameter of the inverter may be the voltage change ratio of a switching waveform.

The cycle in the present invention described above does not have to precisely coincide with an operating cycle of the device to which the present invention is applied, as long as the cycle is an interval during which the device operates in the same motion. For example, only an interval during which the behavior of the device significantly varies and a large electric current runs into a motor may be treated as the cycle in the present invention.

The motor 21 or 121 may be a linear motor in place of a rotary motor.

In place of the motor encoder, a rotary encoder or a linear encoder that directly detect the position and speed of the mechanical load may be used.

In place of the combination of the external power source and the converter, a DC power source (a DC generator, a fuel cell, a battery or the like) may be used to directly supply DC electric power.

REFERENCE SIGNS LIST

15 DC bus
17 capacitor
19, 19A, 19B, 19C inverter
21, 21A, 21B, 21C motor
23, 23A, 23B, 23C mechanical load (same load pattern device)
25, 25A, 25B, 25C motor encoder
27, 27A, 27B, 27C controller
29 command value generator
41 power controller
43 motor current measuring device
45 command calculator
47 PWM modulator
49 carrier wave oscillator
51 gate drive circuit
61 voltage measuring device
63 current measuring device
81 electric power amount calculator
83 parameter selection/instruction unit
91 battery
93 DC-DC converter
95 DC-DC converter control circuit
111 external power source
113 converter
119, 119A, 119B inverter
121, 121A, 121B motor
123, 123A, 123B mechanical load (same load pattern device)
125, 125A, 125B motor encoder
127, 127A, 127B controller
129 command value generator
140 wireless electric power transmission device
141 electric-power-supplying antenna coil
142 electric-power-receiving antenna coil
143 oscillation circuit
144 drive clock generating circuit
145 driver control circuit
146 driver
147 rectifier circuit
150 radio signal communication channel
152 radio signal transmitter
154 radio signal receiver
161 voltage measuring device
163 current measuring device
181 electric power amount calculator
183 parameter selection/instruction unit

The invention claimed is:

1. A power-saving driving device that is provided for a device having the same load pattern and driven by a motor receiving electric power from an inverter, the power-saving driving device comprising a DC-DC converter driven by a battery and the inverter driven by an output of the DC-DC converter, and further comprising:
an electric power amount calculator that calculates an electric power amount received from the battery in the same load pattern; and
a parameter selection/instruction unit that causes a parameter of the inverter to change to be a plurality of values, compares the received electric power amounts respectively corresponding to the values of the parameter, selects the parameter value minimizing the received electric power amount, and instructs the selected parameter value to the inverter.

2. The power-saving driving device according to claim 1, further comprising a command value generator that outputs a cycle start signal and a cycle end signal of the load pattern.

3. The power-saving driving device according to claim 1, wherein the parameter of the inverter is carrier wave frequency and an output voltage of the DC-DC converter.

4. The power-saving driving device according to claim 2, wherein the parameter of the inverter is carrier wave frequency and an output voltage of the DC-DC converter.

5. A power-saving driving method that is performed for a device having the same load pattern and driven by a motor receiving electric power from an inverter, the power-saving driving method comprising the step of providing a DC-DC converter driven by a battery and the inverter driven by an output of the DC-DC converter, and further comprising the steps of:
causing a parameter of the inverter to change to be a plurality of values;
calculating electric power amounts received from the battery in the same load pattern, the electric power amounts respectively corresponding to the values of the parameter;
comparing the received electric power amounts respectively corresponding to the values of the parameter;
selecting the parameter value minimizing the received electric power amount; and
instructing the selected parameter value to the inverter.

6. A power-saving driving device that is provided for a device having the same load pattern and driven by a motor that receives electric power from a wireless electric power transmission device, the power-saving driving device comprising:
an electric power amount calculator that calculates an electric power amount on the primary side of the wireless electric power transmission device in the same load pattern; and
a parameter selection/instruction unit that causes a parameter of the wireless electric power transmission device to change to be a plurality of values, compares the electric power amounts on the primary side respectively corresponding to the values of the parameter, selects the parameter value minimizing the electric power amount on the primary side, and instructs the selected parameter value to the wireless electric power transmission device.

7. The power-saving driving device according to claim 6, the power-saving driving device further comprising a command value generator that outputs a cycle start signal and a cycle end signal of the load pattern.

8. The power-saving driving device according to claim 6, wherein the parameter of the wireless electric power transmission device is oscillation frequency on the electric-power-supplying side.

9. The power-saving driving device according to claim 7, wherein the parameter of the wireless electric power transmission device is oscillation frequency on the electric-power-supplying side.

10. A power-saving driving method that is performed for a device having the same load pattern and driven by a motor that receives electric power from a wireless electric power transmission device, the power-saving driving method comprising the steps of:

causing a parameter of the wireless electric power transmission device to change to be a plurality of values;

calculating electric power amounts on the primary side of the wireless electric power transmission device in the same load pattern, the electric power amounts respectively corresponding to the values of the parameter;

comparing the electric power amounts on the primary side respectively corresponding to the values of the parameter;

selecting the parameter value minimizing the electric power amount on the primary side; and instructing the selected parameter value to the wireless electric power transmission device.

* * * * *